Nov. 20, 1956  R. DEMALANDER  2,770,871
FILLER METAL PIECE FOR THE WELDING
OF SPHEROIDAL GRAPHITE CAST IRON
Filed March 9, 1953
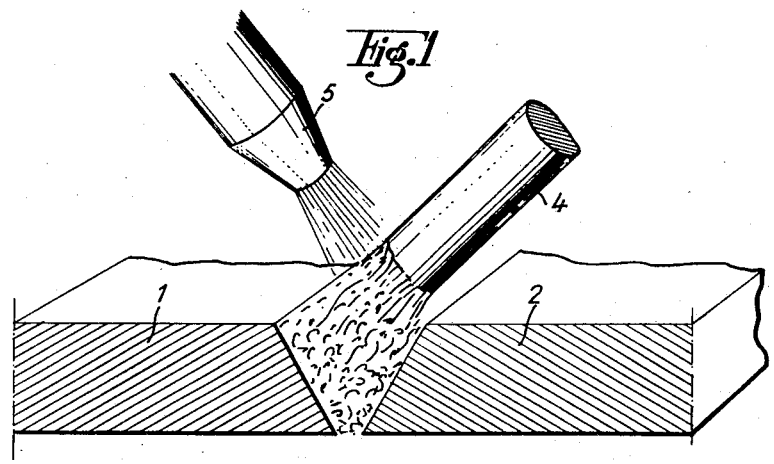
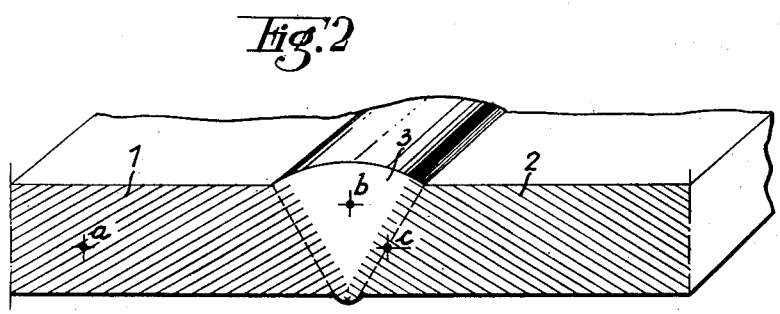
  
Inventor
Roger DEMALANDER
by: J. Delattre-Seguy
Attorney

United States Patent Office 2,770,871
Patented Nov. 20, 1956

2,770,871

FILLER METAL PIECE FOR THE WELDING OF SPHEROIDAL GRAPHITE CAST IRON

Roger Demalander, Pont-a-Mousson, France, assignor to The Compagnie de Pont-a-Mousson, Nancy, France, a French body corporate Application March 9, 1953, Serial No. 341,043

Claims priority, application France March 12, 1952

8 Claims. (Cl. 29—196.1)

The present invention relates to the welding of spheroidal graphite cast irons which are well known for their mechanical properties and corrosion resistance.

Various methods are known for welding ordinary cast iron parts. Normally, these welds are realized with the aid of filler metals of various compositions that give a weld deposit having a generally different metal composition from that of the parts to be united. The mechanical properties of the weld deposit obtained in this way, are similar to those of these ordinary cast irons, i. e. they have a tensile strength of the order of 20 to 25 kg./mm.² and their elongation is often negligible.

However, in the case of spheroidal graphite cast irons whose mechanical properties are markedly superior, their tensile strength being of the order of 50 to 80 kg./mm.² and their elongation being sometimes as much as 20%, these welds are inadequate.

If the filler metals differ from this spheroidal graphite cast iron, there is obtained a heterogeneous weld so far as its constituents are concerned. Thus, firstly, the zone where the metal parts and the filler metal meet is more brittle than the metal parts themselves and, secondly, a tendency to corrosion results from the electro-chemical couple thereby formed.

Even in the case where the filler metal utilized is constituted by cast iron or a cast iron alloy of the best quality there exists a difference between the internal structures of the welded parts and that of the weld due to a difference in the form of graphite. The graphite, in the lamella form, is the cause of a certain brittleness and does not enable a resistance comparable with that of the spheroidal graphite cast iron pieces to be obtained.

The use of a filler cast iron itself having spheroidal graphite but no free cementite for the weld is conceivable, but experience has shown that welds obtained with such cast iron have a heterogeneous structure.

Experimental work that has been carried out seems to indicate that this heterogeneousness is due to a phenomenon of flotation or segregation of the spheroidal particles contained in the filler metal during the melting of this metal at the moment of welding. Further, it has been found that if a weld is executed with a spheroidal graphite cast iron, in certain cases the latter is found to be in the lamella form after the weld has solidified.

It is known that graphite in the spheroidal form is obtained because of the presence in the cast iron, in relatively small amounts, of certain constituents. Among these constituents, the best known are magnesium, cerium and calcium.

It is also known that if the amount of one of these constituents is altered, there exists, for given melting and cooling conditions, a critical amount above which the presence of this constituent provokes the formation of white cast iron in which the major part of the carbon is in the carbide state.

The invention has for its object to provide a filler metal piece in the form of a rod, bar, wire, disc, etc., for welding parts in spheroidal graphite cast iron that permits a welded joint to be obtained in which the weld deposit has an internal structure that is practically identical to that of the cast iron of said parts as well as having equivalent mechanical properties.

The invention has for further object to provide a filler metal piece of cast iron including carbon in an amount comprised between 2.5 and 4.5%, at least 70% of this carbon being combined in the form of unstable carbides whereas the rest of this carbon is present in the free state in the form of simple microscopic germs or nuclei (also as germs or nucleae of crystallization) of graphite, said cast iron further including a stabilizing agent for these carbides, this agent being of such nature that, at the temperature of solidification of said cast iron, said agent is active as a stabilizer only when it is in excess of a critical amount below which said agent favors the formation of spheroidal particles of graphite, its actual amount exceeding said critical amount to an extent less than the amount of loss which said agent undergoes when said cast iron is melted for the welding purpose.

Owing to this feature, the state of the filler metal piece remains perfectly stable up to the amount of its use, but at the moment of welding, the melting of this filler metal piece occasions, as a result of a partial volatilisation, of a chemical combination, etc. of the stabilizing agent, a decrease in the amount of said agent to below the aforementioned critical amount, and as soon as the unstable carbides decompose, the liberated graphite assemble around the microscopic germs or nuclei and form spheroidal particles.

Preferably, said agent includes at least a constituent taken from the group consisting of magnesium, cerium, and calcium.

In the case where the stabilizing agent is magnesium, the welding rod or other filler metal piece has, preferably, the following composition by weight in addition to iron:

|  | Percent |
| --- | --- |
| Total carbon | 3 to 4.3 |
| Combined carbon | 2.7 to 3.9 |
| Silicon | 1.8 to 4 |
| Manganese | 0.1 to 0.8 |
| Phosphorus | 0.05 to 0.30 |
| Sulphur | < 0.05 |
| Stabilizing magnesium | 0.06 to 0.2 |

In the case where the stabilizing agent is cerium, the composition may be similar to the foregoing, the amount of cerium being comprised between 0.04 and 0.20%.

The invention has for further object to provide a welded assembly of parts in cast iron in which the carbon is in the form of spheroidal graphite, the weld deposit being obtained from the aforementioned filler metal piece and comprising cast iron in which the carbon due to the decomposition of the unstable carbides is assembled in the form of uniformly distributed spheroidal particles of graphite, the micrographs of the cast iron of said filler metal being identical to those of said assembled parts.

The carbon and/or silicon content of the welding rod or other filler metal piece may be advantageously greater by 0.10 to 0.50% and by 0.2 to 1% respectively, than those contents of the cast iron of the welded and assembled parts.

In the accompanying drawing given merely by way of example:

Fig. 1 is a longitudinal sectional view of two parts to be welded together, this figure showing, moreover, the welding rod in accordance with the invention, the weld in accordance with the invention, and the oxyacetylene blowpipe.

Fig. 2 is a similar sectional view of the two parts united by the weld; the weld deposit itself has not been shaded so as to render the view more clear, whereas the shading on the two parts slightly overlap the weld deposit so as to represent the continuity of the structure obtained.

Figs. 3 to 5 are micrographs A, B, C, having a magnification of about 100 X, taken at the regions indicated by the crosses a, b, and c in Fig. 2.

By way of example, good results have been obtained by welding the parts 1 and 2 in spheroidal graphite cast iron including magnesium and having the following composition by weight in addition to the iron:

| | Percent |
|---|---|
| Carbon | 3.40 |
| Silicon | 2.50 |
| Manganese | 0.3 |
| Phosphorus | 0.11 |
| Sulphur | 0.01 |
| Magnesium | 0.06 | by utilizing, for obtaining the weld deposit 3, a rod 4 having one or other of the compositions I and II as follow:

*Composition I*

| | Percent |
|---|---|
| Carbon | 3.85 |
| Silicon | 2.70 |
| Manganese | 0.15 |
| Phosphorus | 0.06 |
| Sulphur | 0.01 |
| Magnesium | 0.11 |

*Composition II*

| | Percent |
|---|---|
| Carbon | 3.65 |
| Silicon | 2.90 |
| Manganese | 0.19 |
| Phosphorus | 0.05 |
| Sulphur | 0.01 |
| Cerium | 0.07 |

Using one of the two foregoing compositions, the welding rod 4 was obtained by sand casting in the form of a cylinder by the usual processes.

With a rod cross-sectional size of 7 mm. diameter, it was found that cast irons with either of the foregoing compositions so solidified that at least 90% of the carbon was in the combined state.

The welding of the parts 1 and 2 was effected by means of an oxyacetylene blowpipe 5 with the use of a normal protective flux, for instance the product sold under the trade name "Safonte" of the French company S. A. F. and in allowing the weld deposit 3 to cool in air.

The filler cast iron was heated very slightly above its melting temperature for a very short period i. e. just necessary to bring this cast iron to the melted state.

In the foregoing example, as the filler cast iron becomes pasty at 1120° C., it was heated to about 1200° C. and for a weld deposit having a length of 24 cm. and a cross-sectional size of 0.80 cm.$^2$, the welding operation was effected in about 12 minutes, but at each point of the weld deposit the filler metal remained in the molten state at the most only one minute.

During the operation, a part of the magnesium contained in the filler cast iron disappeared by volatilization and oxidation so that the actual magnesium content of the weld deposit obtained was only about 0.08%. With these weld cooling conditions, this magnesium content is less than the critical content above which the cast iron becomes white when it solidifies.

Owing to the fact that the carbon of the rod 4 according to the invention is before use almost completely in the combined state (the free graphite content not exceeding 10% of the total carbon content and being in the form of haphazardly scattered microscopic nuclei or germs in the mass without an ordered distribution) the graphite, which is formed at the moment of the melting and during the solidification, has no time to shift due to the fact that its specific gravity is less than the metal mixture in the center of which it is embedded, and it forms preferably on the pre-existant microscopic nuclei or germs of graphite. In other words, the above mentioned phenomenon of floatation or segregation is not observed.

The weld deposit obtained has a homogeneous distribution of graphite in the speroidal form.

Figs. 3, 4 and 5 represent micrographs A, B and C to a magnification of 100 X carried out at a, b and c in the metal of the part 1, in the weld deposit 3, and in the zone between the weld deposit and the welded metal part. It can be seen that in the three micrographs the cast iron is in the form of a pearlitic iron matrix 6 in which spheres of graphite 7 are embedded, which is characteristic of spheroidal graphite cast irons. The similarity of the three micrographs shows that there is no lack of continuity between the cast iron of the members 1 and 2 and that of the weld deposit 3. The unit obtained is, therefore, perfectly homogeneous.

Tensile tests carried out on specimens taken from the weld deposit 3 and from the metal of the welded parts 1 and 2, have shown practically the same mechanical properties (a tensile strength of the order of 68 kg./mm.$^2$ and an elongation of 2%).

Owing to the aforementioned features, a weld deposit 3 can be given predetermined mechanical properties and the strength of a welded joint can be accurately calculated.

The use of a welding cast iron according to the invention has numerous other advantages.

Owing to the hardened structure of the filler cast iron according to the invention and owing to its better heat conductivity and its lower melting point compared with that of a graphitic cast iron, the welding operation is easier and a more even weld deposit is more easily obtained.

It is to be noted that, for the same heating temperature, this cast iron according to the invention is more fluid than ordinary cast irons.

The foregoing example relates to the welding of two pieces having a pearlitic structure, but it will be understood that after welding, the welded assembly may be subjected to any suitable heat treatment for purposes of changing the structure, and in particular ferritization treatments.

If the parts to be welded had undergone a heat treatment before welding, it suffices to subject the weld deposit to an identical local heat treatment so as to endow it with the same structure as the parts.

Thus the welding rod according to the invention has been used in welding, end to end, two tubular members of spheroidal graphite cast iron about 150 mm. in diameter and having 8 mm. wall thickness. The metal of these two members exhibited before welding a ferritic matrix obtained after a suitable heat treatment of known type.

The analysis of this metal was as follows, by weight in addition to the iron:

| | Percent |
|---|---|
| Total carbon | 3.52 |
| Silicon | 2.94 |
| Manganese | 0.34 |
| Phosphorus | 0.10 |
| Sulphur | 0.008 |
| Magnesium | 0.065 |

The weld deposit was obtained by means of an oxyacetylene blowpipe in accordance with a known method by using a welding rod according to the invention and having the following analysis by weight:

| | Percent |
|---|---|
| Total carbon | 3.57 |
| Combined carbon | 2.90 |
| Silicon | 3.33 |
| Manganese | 0.32 |
| Phosphorus | 0.08 |
| Sulphur | 0.003 |
| Magnesium | 0.12 |

The weld deposit obtained, which had, as mentioned above, a pearlitic matrix, was subjected to a local ferritization heat treatment with the aid of an annular furnace of known type.

The welded unit obtained, after ferritization of the weld deposit, was subjected to an internal hydraulic pressure. No leakage or escape was observed at the joint until the fracture pressure at 345 kg./cm.² was attained.

An inspection of the fracture showed a longitudinal slit in the wall of one of the tubular members at a distance of 0.5 mm. from the weld deposit, which latter was neither split, torn, nor lifted off the welded members.

A micrograph of the metal revealed, as indicated above, a complete homogeneity and a similarity in the structures of the tube member, the weld deposit and the joint zone.

Further, the analysis of the weld deposit was as follows:

|  | Percent |
|---|---|
| Total carbon | 3.49 |
| Silicon | 3.02 |
| Manganese | 0.27 |
| Phosphorus | 0.07 |
| Sulphur | 0.004 |
| Magnesium | 0.08 |

The tensile test specimens taken parallel to the axis of the tubular members, in the members themselves, and across the weld deposit, gave the following results:

Specimens taken from the tubular members: Tensile strength, 56 to 58 kg./cm.²; elongation, 7 to 9%.

Specimens taken from the weld deposit: Tensile strength, 52 to 54 kg./cm.²; elongation, 8 to 10%.

Un-notched resilience test specimens of size 10 x 6 x 80 mm. taken across the weld deposit showed a resilience relating to the cross-section of 8 to 12 kg./cm.² with a permanent bend angle of 25 to 35°.

The invention is not limited to the precise details of the compositions hereinbefore indicated which have been given merely by way of example.

Having now described my invention what I claim as new and desire to secure by Letters Patent is:

1. Filler metal piece for the welding of spheroidal graphite cast iron parts, said filler metal piece being made of an unstable cast iron which includes carbon in an amount comprised between 2.5 and 4.5%, at least 70% of this carbon being combined in the form of unstable carbides whereas the rest of this carbon is present in the free state in the form of simple germs of graphite, said cast iron further including a stabilizing agent for these carbides, this agent being of such nature that, at the temperature of solidification of said cast iron, said agent is active as a stabilizer only when it is in excess of a critical amount below which said agent favors the formation of spheroidal particles of graphite, its actual amount exceeding said critical amount to an extent less than the amount of loss that said agent undergoes when said cast-iron piece is melted for the welding purpose.

2. Filler metal piece for the welding of spheroidal graphite cast iron parts, said filler metal piece being made of an unstable cast iron which includes carbon in an amount comprised between 2.5 and 4.5%, at least 70% of this carbon being combined in the form of unstable carbides whereas the rest of this carbon is present in the free state in the form of simple germs of graphite, said cast iron further including a stabilizing agent for these carbides, said agent comprising at least a constituent taken from the group consisting of magnesium, cerium, and calcium, and the actual amount of this agent in said cast iron being such that it is greater than the critical amount below which this agent favors the formation of spheroidal particles of graphite only by an amount less than the amount of loss that this agent undergoes when said cast-iron piece is melted for welding purpose.

3. Filler metal piece as claimed in claim 2, comprising at least 90% of carbon in the form of combined carbon and at the most 10% in the form of free carbon.

4. Filler metal piece for the welding of spheroidal graphite cast iron parts, said filler piece being made of an unstable cast iron which includes carbon in an amount comprised between 2.5 and 4.5%, at least 70% of said carbon being combined in the form of unstable carbides whereas the rest of said carbon is present in the free state in the form of simple germs of graphite, and said cast iron further including a stabilizing agent for said carbides, this agent comprising magnesium, and the composition by weight of said filler metal piece being as follows, in addition to the iron:

|  | Percent |
|---|---|
| Total carbon | 3 to 4.3 |
| Combined carbon | 2.7 to 3.9 |
| Silicon | 1.8 to 4 |
| Manganese | 0.1 to 0.8 |
| Phosphorus | 0.05 to 0.30 |
| Sulphur | < 0.05 |
| Stabilizing magnesium | 0.05 to 0.2 |

5. Filler metal piece as claimed in claim 4, having the following composition by weight, in addition to the iron:

|  | Percent |
|---|---|
| Total carbon | 3.57 |
| Combined carbon | 2.90 |
| Silicon | 3.33 |
| Manganese | 0.32 |
| Phosphorus | 0.08 |
| Sulphur | 0.003 |
| Magnesium | 0.12 |

6. Filler metal piece for the welding of spheroidal graphite cast iron parts, said filler piece being made of an unstable cast-iron which includes carbon in an amount comprised between 2.5 and 4.5%, at least 70% of said carbon being combined in the form of unstable carbides whereas the rest of said carbon is present in the free state in the form of simple germs of graphite, and said cast iron further including a stabilizing agent for said carbides, this agent comprising cerium and the composition by weight of said filler metal piece being as follows, in addition to the iron:

|  | Percent |
|---|---|
| Total carbon | 3 to 4.3 |
| Combined carbon | 2.7 to 3.9 |
| Silicon | 1.8 to 4 |
| Manganese | 0.1 to 0.8 |
| Phosphorus | 0.05 to 0.30 |
| Sulphur | < 0.05 |
| Stabilizing cerium | 0.04 to 0.2 |

7. A process for welding spheroidal graphite cast-iron parts, which consists in melting in contact with said parts a filler metal piece made of an unstable cast-iron which includes carbon in an amount comprised between 2.5% and 4.5%, at least 70% of said carbon being combined in the form of unstable carbides, the balance of said carbon being present in the free state in the form of simple germs of graphite, said unstable cast-iron further including a stabilizing agent for said carbides, said agent being active as a stabilizer, at the temperature of solidification of said cast iron in said piece, only when its actual amount is in excess of a critical amount below which said agent favors the formation of spheroidal particles of graphite, said excess of said actual amount over said critical amount being smaller than the amount of loss suffered by said agent when said piece is melted for the welding purpose; whereby, upon melting of said piece, the structure of the cast-iron of the weld deposit becomes identical with the structure of the cast-iron in said parts.

8. A unit comprising two cast iron members united by welding, the cast iron of said members comprising spheroidal particles of graphite and the weld deposit comprising cast iron in which the carbon is grouped in the form of uniformly distributed spheroidal particles of graphite, the micrographs of the cast iron of said deposit being identical to those of said members, said cast iron members having the following approximate composition by weight, in addition to the iron:

| | Percent |
|---|---|
| Total carbon | 3.52 |
| Silicon | 2.94 |
| Manganese | 0.34 |
| Phosphorus | 0.10 |
| Sulphur | 0.008 |
| Magnesium | 0.065 | whereas the weld deposit has the following approximate composition by weight in addition to the iron:

| | Percent |
|---|---|
| Total carbon | 3.49 |
| Silicon | 3.02 |
| Manganese | 0.27 |
| Phosphorus | 0.07 |
| Sulphur | 0.004 |
| Magnesium | 0.08 |

References Cited in the file of this patent

UNITED STATES PATENTS

| 2,054,770 | Kautz | Sept. 15, 1936 |
| 2,229,405 | Currier | Jan. 21, 1941 |
| 2,288,869 | Wasserman | July 7, 1942 |
| 2,488,511 | Morrogh | Nov. 15, 1949 |
| 2,488,513 | Morrogh | Nov. 15, 1949 |

FOREIGN PATENTS

| 298,781 | Great Britain | Oct. 18, 1928 |

OTHER REFERENCES

The Welding of Cast Iron by Oxy Acetylene Process by L. Tibbenham, 1947, 2nd edition, published by Sir Isaac Pitman and Sons Ltd. London, page 88.